Patented Mar. 15, 1932

1,849,635

UNITED STATES PATENT OFFICE

SAMUEL PALKIN, OF WASHINGTON, DISTRICT OF COLUMBIA, AND HOWARD R. WATKINS, OF SOMERSET, MARYLAND

PROCESS FOR THE PRESERVATION OF ETHER

No Drawing. Original application filed May 21, 1928, Serial No. 279,626. Divided and this application filed June 14, 1929. Serial No. 371,040.

(GRANTED UNDER THE ACT OF MARCH 3, 1883, AS AMENDED APRIL 30, 1928; 370 O. G. 757)

This application is made under the act approved April 30, 1928, and the invention herein described may be manufactured and used by or for the Government for governmental purposes without payment to us of any royalty thereon.

This application is a division of application filed by the same applicants which bears Serial No. 279,626, and filing date, May 21, 1928, and having the same title.

This invention relates to methods for the preservation of ether by the employment of oxidants in alkaline solutions, such as sodium hydroxide and potassium hydroxide, the solutions preferably being distributed or absorbed in asbestos or other suitable absorptive material so as to be brought freely into contact with the ether.

In the operation of our invention a saturated water solution of potassium permanganate is made and diluted with the strong solution of alkali prepared by using one part of alkali to two parts of water to approximately three times the volume of the potassium permanganate solution and the precipitate is separated by decantation or filteration. Asbestos is then impregnated with this alkaline permanganate solution, leaving the asbestos in a thoroughly dampened but more or less loose form. Ether is preserved with this reagent using proportions approximating 5 grams to 300 cc. of purified ether.

The process set forth in the paragraph next preceding represents a method of preservation of ether.

We have found that purified ether stored in vessels of glass, brown or white, and in tin-lined cans in contact with these preservatives has not developed aldehydes, acids or peroxides even when kept in warm places or exposed to direct sunlight. Such ether also was found to conform to the other tests prescribed for U. S. P. ether.

We define "oxidant compound" as used herein and in the claims, as an aqueous solution of any oxidizing substance and strong alkali, that in ether prevents the existence therein of impurities, such as oxygen, peroxides, aldehydes and acid, and does not itself contaminate the ether. Such an oxidizing substance may be sodium permanganate, potassium permanganate, or other soluble permanganates, or other oxidizing substances capable of reacting with or destroying peroxides.

Asbestos is employed in our process for the purpose of providing a large surface for the exposure of the preservative agent. It also has the advantage of being inert and insoluble in ether.

It will be understood that any other means whereby the preservative agent may be brought, in a sufficient degree, into contact with the ether, may be employed.

The use of the oxidant compound without alkali may be of value to some extent in the preservation of ether but we use alkali with it in order to serve the purpose of preventing the formation of impurities other than peroxide.

We claim:

1. A method for the storing of ether, comprising the subjection of said ether to the action of an aqueous solution of any oxidizing substance and a strong alkali.

2. A method for the storing of ether, comprising the subjection of said ether to the action of a permanganate dissolved in a solution of alkali.

3. A method for the storing of ether, comprising the subjection of said ether to the action of potassium permanganate dissolved in a solution of alkali.

4. A method for the storing of ether, comprising the subjection of said ether to the action of an aqueous solution of any oxidizing substance and a strong alkali distributed throughout a mass of absorptive material.

5. A method for the storing of ether, comprising the subjection of said ether to the action of a permanganate dissolved in a solution of alkali distributed throughout a mass of absorptive material.

6. A method for the storing of ether, comprising the subjection of said ether to the action of potassium permanganate dissolved in a solution of alkali distributed throughout a mass of absorptive material.

7. A method for the storing of ether, comprising the subjection of said ether to the action of a solution of alkali and a permanganate, the alkali and the permanganate being present in asbestos.

8. A method for the storing of ether, comprising the subjection of said ether to the action of a solution of alkali and potassium permanganate, the alkali and the potassium permanganate being present in asbestos.

SAMUEL PALKIN.
HOWARD R. WATKINS.